(12) United States Patent
Zieger

(10) Patent No.: US 9,541,213 B2
(45) Date of Patent: Jan. 10, 2017

(54) ELECTROMAGNETIC VALVE FOR A PRESSURE CONTAINER

(75) Inventor: Andreas Zieger, Hofstätten an der Raab (AT)

(73) Assignee: MAGNA STEYR Fahrzeugtechnik AG & Co KG, Graz (AT)

(*) Notice: Subject to any disclaimer, the term of this patent is extended or adjusted under 35 U.S.C. 154(b) by 925 days.

(21) Appl. No.: 13/809,034

(22) PCT Filed: Jul. 4, 2011

(86) PCT No.: PCT/EP2011/003306
§ 371 (c)(1),
(2), (4) Date: Jan. 8, 2013

(87) PCT Pub. No.: WO2012/003952
PCT Pub. Date: Jan. 12, 2012

(65) Prior Publication Data
US 2013/0104998 A1 May 2, 2013

(30) Foreign Application Priority Data
Jul. 8, 2010 (DE) ........................ 10 2010 026 548

(51) Int. Cl.
*F16K 31/06* (2006.01)
*F16K 1/34* (2006.01)

(52) U.S. Cl.
CPC ................. *F16K 31/06* (2013.01); *F16K 1/34* (2013.01); *F16K 31/0655* (2013.01); *Y10T 137/0391* (2015.04)

(58) Field of Classification Search
CPC ........... F16K 31/05; F16K 31/06; F16K 1/34; F16K 31/0655; F16K 31/143; Y10T 137/0391

See application file for complete search history.

(56) References Cited

U.S. PATENT DOCUMENTS

| | | | |
|---|---|---|---|
| 4,286,768 A * | 9/1981 | Fiedler, Jr. | ................ 251/129.03 |
| 5,842,679 A * | 12/1998 | Kolchinsky | ........... F16K 31/408 |
| | | | 251/129.18 |
| 6,209,970 B1 | 4/2001 | Kamiya et al. | |
| 7,021,330 B2 * | 4/2006 | Maula et al. | .................. 137/341 |

FOREIGN PATENT DOCUMENTS

| | | |
|---|---|---|
| JP | S56-094082 A | 7/1981 |
| JP | S61-202770 A | 9/1986 |
| JP | H11-222119 A | 8/1999 |

* cited by examiner

*Primary Examiner* — Marina Tietjen
*Assistant Examiner* — Daphne M Barry
(74) *Attorney, Agent, or Firm* — Jordan IP Law, LLC; Todd A. Vaughn

(57) ABSTRACT

An electromagnetic valve for a pressure container and which includes a manual shut-off of the valve, a stop, and an electromagnetic shut-off of the valve with a sealing element, a magnet coil, a tappet, and a spring element. When the magnet coil has been currentlessly switched and deactivated, the tappet pressed against the sealing element by the spring element presses the sealing element onto a second opening so as to suppress a fluidic connection from the pressure container. Also, when the magnet coil is activated, the tappet can be moved away from the sealing element as far as the stop, such that the fluidic connection can be released.

18 Claims, 2 Drawing Sheets

ELECTROMAGNETIC VALVE FOR A PRESSURE CONTAINER

The present application is a National Stage Application of PCT International Application No. PCT/EP2011/003306 (filed on Jul. 4, 2011), under 35 U.S.C. §371, which claims priority to German Patent Application No. DE 10 2010 026 548.9 (filed on Jul. 8, 2010), which are each hereby incorporated by reference in their complete respective entireties.

FIELD OF THE INVENTION

The present invention relates to an electromagnetic valve for a pressure container and to a method for operating an electromagnetic valve on a pressure container, a pressure container, and a composite container.

BACKGROUND OF THE INVENTION

A pressure container for storing liquid or gaseous media, preferably hydrogen or natural gas, comprises at least one storage container for enclosing the liquid or gaseous medium, said storage container having at least one opening, into which a valve is inserted. The liquid or gaseous medium is filled and removed by means of the switching and control elements incorporated into the valve main body. Current is applied to the electromagnetic valve when the medium is removed and said valve is actively opened. No current is applied to the electromagnetic valve during the filling process. For safety reasons, the electromagnetic valve is closed in the currentless state.

A pilot-operated valve is generally used as an electromagnetic valve in such pressure containers so as to keep the power consumption low.

A gas cylinder valve arrangement is known from DE 10 2006 025 965 A1, which has a housing with a main valve body. The main valve body has a fluid connection, wherein a fluid flows between the inlet and the housing or a valve body outlet, wherein a valve stem for blocking the fluid flow through a through-connection can be moved. At the main valve body, a manual shut-off valve runs within the valve body so as to selectively block the fluid flow through the through-connection. The use of two valves increases both the amount of installation space and the costs for such an electromagnetic valve.

SUMMARY OF THE INVENTION

The object of the present invention therefore is to provide an electromagnetic valve, a method for operating an electromagnetic valve and a pressure container, with which the electromagnetic valve requires a small amount of installation space in spite of manual shut-off. Furthermore, production of the electromagnetic valve should be cost-effective.

This object is achieved with an electromagnetic valve for a pressure container, comprising a manual shut-off of the valve, a stop, and an electromagnetic shut-off of the valve with a sealing element, a magnet coil, a tappet, and a spring element, wherein, when the magnet coil has been switched so as to be currentless and is deactivated, the tappet pressed against the sealing element by the spring element presses the sealing element onto a second opening together with the force exerted by the pressure so as to suppress a fluidic connection into or from the valve or the pressure container, and, when the magnet coil is activated, the tappet can be moved away from the sealing element as far as the stop, whereby the fluidic connection can be released, since the tappet is mechanically connected to the sealing element, wherein the stop is formed by a movable stop part of the manual shut-off.

With such an electromagnetic valve, the installation space is made smaller, since, with a manual shut-off of the electromagnetic valve, functional elements of the electromagnetic shut-off are actuated by hand to close the pressure container. Such a device enables both an electromagnetic opening and closing of the electromagnetic valve and a manual opening and closing of the electromagnetic valve using the same sealing element, so that the valve only has one sealing element.

In a further embodiment, the movable stop part actuates the sealing element of the electromagnetic shut-off, preferably directly, and/or the sealing element can be moved in a first direction by the movable stop part such that the sealing element closes the opening, or the sealing element can be moved in a second direction by the movable stop part such that the sealing element releases the opening. Due to the reduced number of necessary components of the electromagnetic valve, not only is the required installation space reduced, but at the same time the number of sealing points.

In particular, the movable stop part is mechanically connected to the tappet to move the tappet. As a functional element of the electromagnetic shut-off, the tappet is actuated manually in this case by the movable stop part.

In a supplementary embodiment, the movable stop part can be moved by a mechanism, wherein the mechanism in particular comprises a thread or a spindle drive.

The tappet preferably comprises a connection part, which engages into the movable stop part such that the tappet can be moved by the stop part due to a positive fit between the tappet and the stop part. The connection part thus enables the manual opening of the valve. Such a manual opening is necessary, for example so as to empty the pressure container in the event of servicing, without having to actuate the valve electromagnetically.

In a further embodiment, the connection part engages into a cavity in the movable stop part and/or a gap is formed between the tappet and the movable stop part when the magnet coil has been switched so as to be currentless and is deactivated. The function of the valve when actuated electromagnetically is thus reliably ensured.

In one variant, the movable stop part is used as a stop for the tappet when the magnet coil is activated, with restitution of the gap between the tappet and the movable stop part.

In a further embodiment, the fluid can be introduced through a first opening into a chamber, which extends between the tappet and the sealing element of the electromagnetic shut-off unit, whereby a pressure can be built up in the chamber and the tappet can cover a first displacement path when the magnet coil is activated, such that a through-bore in the sealing element is released and the sealing element retains its position during this process.

In a further embodiment, with the through-bore in the sealing element released by the tappet, a counter pressure can be built up at the second opening due to a flow of the fluid through the first opening and the through-bore, wherein, with activated magnetic force of the magnet coil, the tappet covers a second displacement path as soon as the pressure ratio between both sides of the sealing element is sufficient, wherein the sealing element can be moved out of its position by a driver and releases the second opening as soon as the force of the magnet coil and the pressure ratio between both sides of the sealing element are sufficient for this purpose, whereby a fluidic connection, which is preferably larger compared to the through-bore, between the first and the second opening can be released. Due to such a staggered opening of the valve, the force that is necessary to move the sealing element out of its position and to release the second opening is reduced. This is achieved in particular since a counter pressure builds up on a second side of the sealing element. In addition, the time required to open the valve is reduced, since the sealing element is actively opened by the driver between the first and second opening with a sufficient pressure ratio.

In a supplementary variant, the driver has a first recess directed toward the sealing element, and the sealing element comprises a secondary recess, wherein a support element is inserted in an engaging manner into the first recess and the second recess and a geometry of the first recess and of the second recess is designed such that the tappet covers the first displacement path without any change to the position of the sealing element.

In a preferred embodiment, the sealing element consists at least in part, in particular completely, of a metal material or of plastic.

In a further embodiment, the tappet and/or the valve housing and/or the driver and/or the valve main body consists at least in part, in particular completely, of metal, for example steel or aluminum.

A method described in this patent application can be carried out expediently by the valve.

A pressure container in accordance with the invention, in particular a composite container, comprises a valve described in the patent application.

A method in accordance with the invention for operating an electromagnetic valve in a pressure container, wherein in said method the valve is shut off by keeping a magnet coil in the de-energized state, wherein a tappet is pressed against a sealing element by a resilient force and by an optional compressive force and the sealing element thus closes a second opening, and/or, when the magnet coil is energized, the valve is electromagnetically opened by moving the tappet by means of the magnetic force against the resilient force and the sealing element is entrained by the tappet, preferably after pressure compensation via the through-bore in the sealing element, and the second opening is thus opened, and the valve is shut off or opened manually, wherein, for manual shut-off, the stop part is moved in a first direction, whereby the sealing element is moved toward the second opening and the second opening is thus closed, and/or, for manual opening, the stop-part is moved in a second direction, whereby the sealing element is moved away from the second opening and the second opening is thus opened. Despite a limited number of structural elements, the valve can be reliably actuated electromagnetically and can also be reliably opened and closed manually.

In a supplementary variant, the tappet and/or the sealing element is/are entrained by the stop part.

The tappet is preferably moved by the stop part by means of a positive connection between the stop part and tappet and/or the sealing element is preferably moved by the tappet by means of a positive, integral and/or non-positive connection between the tappet and the sealing element.

BRIEF DESCRIPTION OF THE DRAWINGS

An exemplary embodiment of the invention will be described in greater detail hereinafter with reference to the accompanying drawing, in which.

DETAILED DESCRIPTION OF EMBODIMENTS

Figure 1:
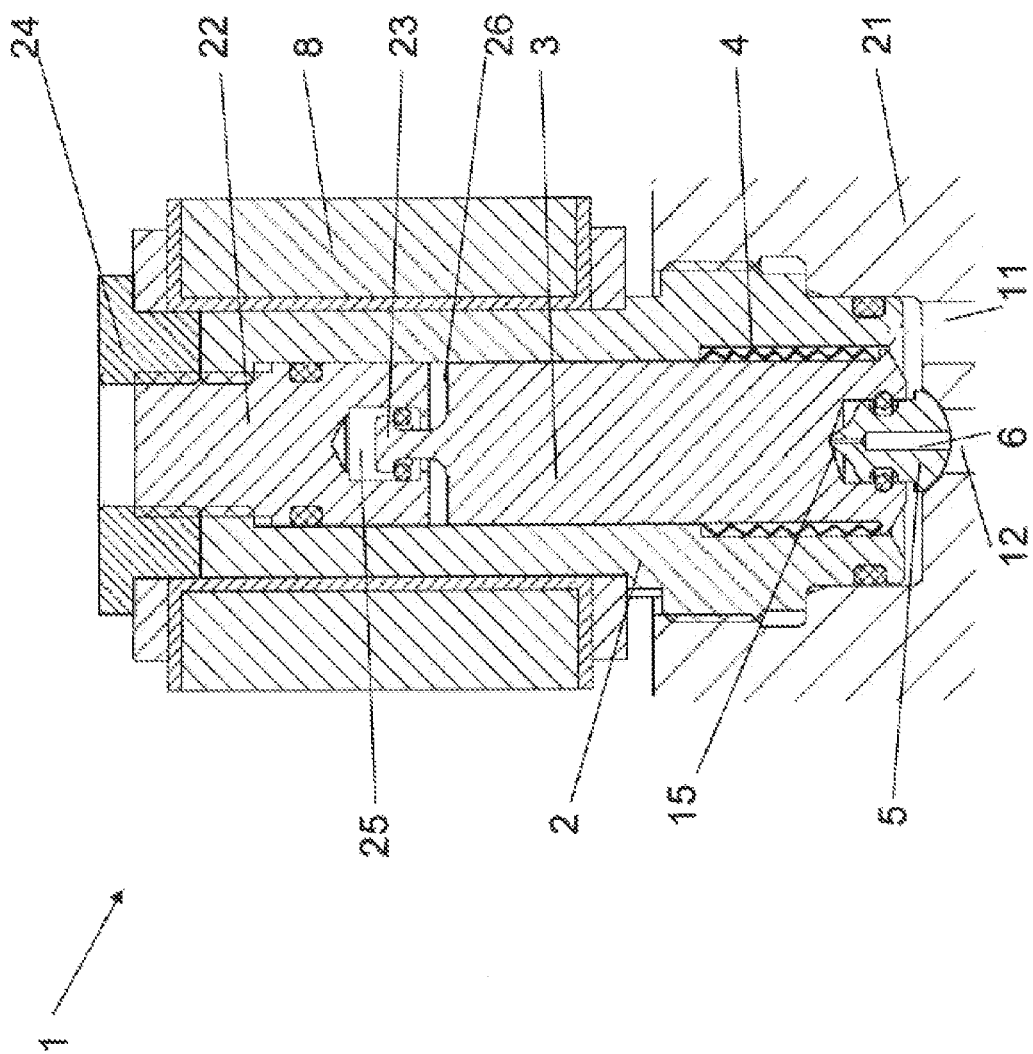
FIG. 1 illustrates a section through an electromagnetic valve.

The electromagnetic valve 1 illustrated in FIG. 1 is used to remove a liquid or a gas, for example hydrogen or natural gas, which will be referred to hereinafter as fluid, from a pressure container or to fill the pressure container (not illustrated). The electromagnetic valve 1 includes a valve housing 2, in the interior of which a tappet 3 is arranged, which is pressed against a sealing element 5 by way of a spring element 4. In this case, the sealing element 5 has a through-bore 6 in the form of a continuous opening, which has two different cross sections. In the direction toward the tappet 3, the through-bore 6 has a smaller diameter, which is adjoined by a larger diameter, which extends in the opposite direction.

A magnet coil 8 surrounds the valve housing 2 and therefore also the tappet 3, which is arranged in the valve housing 2. The tappet 3 sits via its end face on a protrusion 15 of the sealing element 5. The sealing element 5 itself sits on the valve main body 21 of the pressure container at a second opening 12 and therefore closes the valve 1 with respect to the surrounding environment. This portion of the sealing element 5 is referred to as the main seat. By contrast, the portion occupied by the tappet 3 on the protrusion 15 of the sealing element 5, with which the through-bore 6 in the sealing element 5 is kept closed, is referred to as the pilot seat 9.

On the side remote from the sealing element 5, the tappet 3 has a mushroom-shaped connection part 23, which engages in a cavity 25 in a movable stop part 22. The movable stop part 22 and the tappet 3 are separated by a gap 26 when the magnet coil 8 is deactivated. The movable stop part 22 is arranged between the magnet coil 8 and is connected to a hexagon 24, which protrudes from the valve structure. The movable stop part 22 provided with an outer thread is moved manually from the outside by means of the hexagon 24 into the valve housing 2, which has an inner thread, using a screw tool.

If the valve 1 is to be closed manually, the stop part 22 is screwed inwardly toward the sealing element 5 using the hexagon 24 in a first direction toward the tappet 3, until the stop part 22 contacts the tappet 3 (not illustrated) and the gap 26 disappears. The tappet 3 is optionally also pressed against the magnetic force of the magnet coil 8 downwardly against the sealing element 5, which is in turn pressed onto the second opening 12 and closes said opening, whereby the valve 1 is closed manually and cannot be opened, even if the magnet coil 8 is activated. The pressure container also cannot be filled in this state, even with a higher pressure in the opening 12 than in the opening 11, since the sealing element 5 is held in its position by the stop part 22 via the tappet 3, whereby the opening 12 remains closed.

A manual opening of the valve 1 is also possible. The movable stop part 22 is unscrewed from the valve housing 2 in a second direction by means of the hexagon 24, whereby the connection part 23 of the tappet 3 is entrained by the movable stop element 22, since the connection part 23 rests on a lower delimitation of the cavity 25 (not illustrated) and the tappet 3 is raised against the resilient force of the spring element 4. The first and second directions of the movement of the stop part 22 are directed in opposite directions. The tappet 3 releases a pilot seat 9 of the sealing element 5. Following pressure compensation (see the description hereinafter), the sealing element 5 moves in the direction of the tappet 3, whereby the sealing element 5 releases the opening 12 and the valve 1 is opened.

Besides the manual opening and closing of the valve 1, said valve can also be actuated electromagnetically, which is described hereinafter.

Figure 2:
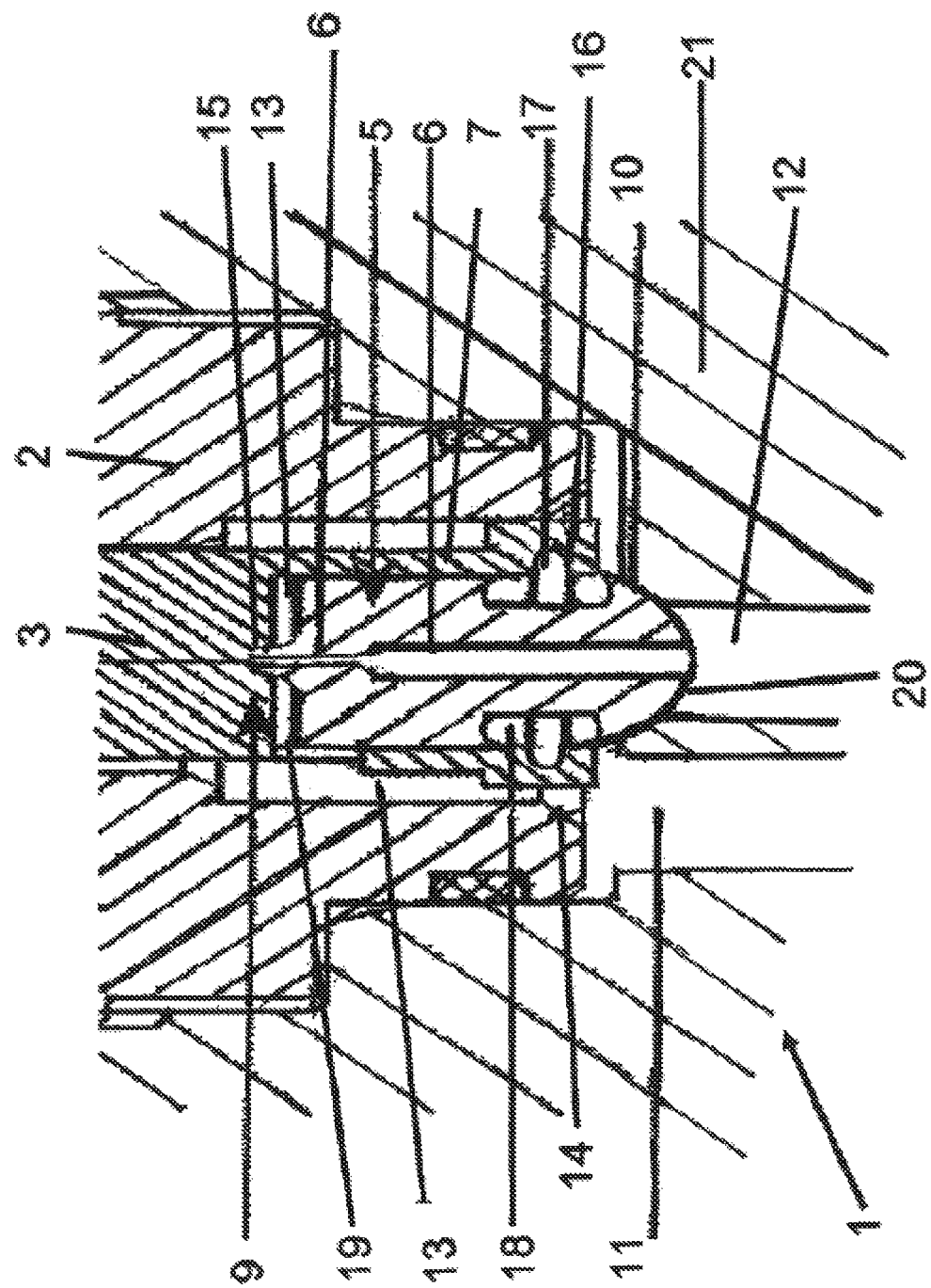
FIG. 2 illustrates a detail of the electromagnetic valve of FIG. 1.

With the pilot seat 9, an annular space 13 is formed between the tappet 3 and the sealing element 5 (FIG. 2) and is connected via a passage 14 to the opening 11, wherein the opening 11 leads to a pressure container. In addition, the tappet 3 is formed integrally with a driver 7, wherein the driver 7 largely surrounds the sealing element 5. The sealing element 5 has a first annular groove 18, which is formed in the lower part of the sealing element 5 in the direction of the opening 12. A support element 17 is inserted into this annular groove 18. This support element 17 is formed such that it protrudes radially beyond the sealing element 5 and engages into a second annular groove 16 in the driver 7. In this case, this second annular groove 16 is formed such that the thickness of the support element 17 corresponds to the axial expansion of the annular groove 16, such that the support element 17 cannot move within the recess 16 in the driver 7. In contrast thereto, the axial expansion of the first annular groove 18 in the sealing element 5 protrudes beyond the thickness of the support element 17, such that the support element 17 is arranged at a distance from the inner walls of the annular groove 18 in the sealing element 5.

The operating principle of the electromagnetic valve 1 will be explained in greater detail hereinafter. Starting from the position of the valve 1 illustrated in FIG. 2, the support element 17 is arranged centrally in the annular groove 18 in the sealing element 5. In this instance, the fluid is to be removed from the pressure container (not illustrated in greater detail) and flows from the valve 1 through the opening 12. In this case, the fluid initially flows through the opening 11 via the passage 14 into the chamber 13, in particular an annular chamber 13. Before the magnet coil 8 is activated, substantially the same pressure as at the first opening 11, which runs into a pressure container interior enclosed by the pressure container, is present in the annular chamber 13 or chamber 13 due to the fluidic connection provided between the first opening 11 and the annular chamber 13 in the annular chamber 13. Due to this pressure, a force is applied to a first side 19 of the sealing element 5 and presses the sealing element 5 onto the valve main body 21 such that the second opening 12 is closed. With a use of the pressure container with the valve 1 in a motor vehicle, the second opening 12 runs for example into an internal combustion engine or a fuel cell, and a filling connection.

If the magnet coil 8 is activated, the tappet 3 moves away from the protrusion 15 of the sealing element 5 in a first displacement path and thus releases the through-bore 6. In the case of the first displacement path, which is covered by the tappet 3, the support element 17, which is entrained by the driver 7 due to the movement of the tappet 3, still moves within the second recess 18 in the sealing element 5. The sealing element 5 thus remains in its position. The fluid flows from the annular chamber 13, through the through-bore 6 released by the tappet 3 and flows out from the sealing element 5 on the opposite side. This requires build-up of a counter pressure on this second side 20 of the sealing element 5, said counter pressure pressing externally against the sealing element 5 so that the sealing element 5 can be moved away from the second opening 12 with a low force.

If the magnet coil 8 continues to be activated and there is a sufficient pressure compensation between the annular chamber 13 and the second opening 12, the tappet 3 covers a second displacement path, in which case the support element 17 is then pressed by the driver 7 against the wall of the annular groove 18 in the sealing element 5, wherein the sealing element 5 is pressed out of its position. Due to the counter pressure, which has been established on the second side 20 of the sealing element 5, merely a relatively low force is necessary to move the sealing element 5 from its position, and the opening 12 in the valve main body 21 is released. Due to this movement of the sealing element 5, the opening 11 is directly connected to the opening 12, wherein the fluid can flow out from the pressure container in a greater quantity than through the through-bore 6.

Once the removal process is complete, the magnet coil 8 is switched so as to be currentless. Since the opening 11 is directly connected to the opening 12 at this moment, approximately the same pressure is present both in the annular chamber 13 and in the opening 12. The compressive forces therefore have only a small influence on the position of the sealing element 5. As a result, if the coil is switched so as to be currentless, the sealing element 5 is moved against the opening 12 in the valve housing 21 by the force of the spring element 4, whereby the opening 12 is closed.

If the pressure container is then to be filled, the magnet coil 8 is switched so as to be currentless. Due to the currentlessly switched, deactivated state of the magnet coil 8, the tappet 3 is pressed onto the sealing element 5 by the effective resilient force of the spring element 4 and thus closes the valve 1. Due to the pressure of the inflowing fluid, which applies a force to the second side 20 of the sealing element 5, the sealing element 5 and the tappet 3 are pressed against the force of the spring 4, and the opening 12 in the valve housing 2 is released. The movements of the tappet 3 for the electromagnetic actuation of the valve 1 are possible because the cavity 25 in the movable stop part 22 permits a movement of the connection part 23 in the cavity 25 due to the geometry thereof with freedom of movement. The stop part 22 is located in a corresponding position for this purpose. The stop part 22 therefore has to be located in this position for an electromagnetic opening and closing of the valve 1, so that the movement of the tappet 3 is not hindered by the stop part 22.

Considered as a whole, key advantages are associated with the electromagnetic valve 1 in accordance with the invention. The valve 1 requires merely one additional stop part 22 so as to use functional elements of the electromagnetic shut-off, such as the tappet 3 and sealing element 5, for manual actuation of the valve 1. Due to the constructional design of the valve 1, the installation space of the valve 1 is made considerably smaller and the number of components is significantly reduced.

LIST OF REFERENCE NUMERALS

1 Valve
2 Valve housing
3 Tappet
4 Spring element
5 Sealing element
6 Through-bore
7 Driver
8 Magnet coil
9 Pilot seat
10 Main seat
11 First opening
12 Second opening
13 Annular chamber
14 Passage
15 Protrusion 16 Second annular groove
17 Support element
18 First annular groove
19 First side of the sealing element
20 Second side of the sealing element
21 Valve main body
22 Movable stop part
23 Connection part
24 Hexagon
25 Cavity
26 Gap

What is claimed is:

1. An electromagnetic valve for a pressure container, comprising:
a first valve shut-off mechanism including a moveable stop configured to manually open and close the electromagnetic valve; and
a second shut-off mechanism configured to electromagnetically open and close the electromagnetic valve, the second shut-off mechanism having a magnet coil, a tappet, a spring element, and a sealing element which is actuated by the stop for movement in a first direction to close an opening that leads to the pressure container, and a second direction to release the opening,
wherein:
in a deactivated state of the magnet coil, the tappet is pressed against the sealing element by the spring element to move the sealing element onto the opening which suppresses a fluidic connection from the pressure container,
in an activated state of the magnet coil, the tappet is moved away from the sealing element as far as the stop so as to release the fluidic connection from the pressure container, and
the electromagnetic valve is configured to open the opening in the activated state of the magnet coil, in which the tappet is moved by a magnetic force against a resilient force, and the sealing element is entrained by the tappet.

2. The electromagnetic valve of claim 1, wherein the stop is mechanically connected to the tappet and configured to move the tappet.

3. The electromagnetic valve of claim 2, wherein the stop is configured for movement by a thread or spindle drive.

4. The electromagnetic valve of claim 1, wherein the tappet comprises a connection part configured for engagement in the stop such that the tappet is moved with the stop.

5. The electromagnetic valve of claim 4, wherein the connection part is configured to engage into a cavity in the stop and/or a gap is formed between the tappet and the stop when the magnet coil is deactivated.

6. The electromagnetic valve of claim 5, wherein the stop is configured for use as a stop for the tappet in the activated state of the magnet coil, with restitution of the gap between the tappet and the stop.

7. The electromagnetic valve of claim 1, wherein fluid is introduced through a first opening into a chamber, which extends between the tappet and sealing element of the second shut-off unit, such that a pressure is built up in the chamber and the tappet covers a first displacement path in the activated state of the magnet coil, such that a through-bore in the sealing element is released and the sealing element retains its position.

8. The electromagnetic valve of claim 7, wherein, when the through-bore in the sealing element is released by the tappet, a counter pressure is built up at the opening due to a flow of the fluid through the first opening and the through-bore.

9. The electromagnetic valve of claim 8, wherein, in the activated state of the magnet coil, the tappet covers a second displacement path, in which case the sealing element is moved out of its position by a driver and releases the opening as soon as a force of the magnet coil and a pressure ratio between sides of the sealing element are sufficient.

10. The electromagnetic valve of claim 9, wherein:
the driver has a first recess directed to the sealing element;
the sealing element comprises a second recess;
a support element is configured for insertion in an engaging manner into the first recess and the second recess;
the first recess and of the second recess are respectfully configured such that the tappet covers the first displacement path without any change to the position of the sealing element.

11. The electromagnetic valve of claim 1, wherein the valve is configured to close the opening in the de-energized state of the magnet coil in which the tappet is moved against the sealing element by a resilient force and the sealing element thereby closes the opening.

12. A pressure container comprising:
an electromagnetic valve having a first valve shut-off mechanism including a moveable stop configured to manually open and close the electromagnetic valve, and a second shut-off mechanism configured electromagnetically open and close the electromagnetic valve, the second shut-off mechanism having a magnet coil, a tappet, a spring element, and a sealing element which is actuated by the stop for movement in a first direction to close an opening that leads to the pressure container, and a second direction to release the opening,
wherein:
in a deactivated state of the magnet coil, the tappet is pressed against the sealing element by the spring element to move the sealing element onto the opening which suppresses a fluidic connection from the pressure container,
in an activated state of the magnet coil, the tappet is moved away from the sealing element as far as the stop so as to release the fluidic connection from the pressure container, and
the electromagnetic valve is configured to open the opening in the activated state of the magnet coil, in which the tappet is moved by a magnetic force against a resilient force, and the sealing element is entrained by the tappet.

13. A method for operating an electromagnetic valve in a pressure container, the method comprising:
shutting off the electromagnetic valve to close an opening in the pressure container by de-energizing a magnet coil, in which a tappet is moved against a sealing element by a resilient force such that the sealing element closes the opening;
activating the electromagnetic valve to open the opening in the pressure container by energizing the magnet coil, in which the electromagnetic valve is electromagnetically opened by moving the tappet via the magnetic force against the resilient force, such that the sealing element is entrained by the tappet to open the opening,
wherein the electromagnetic valve is configured to be:
closed manually such that a stop part of the electromagnetic valve is moved in a first direction to move the sealing element forward and close the opening; and opened manually such that the stop part is moved in a second direction to move the sealing element away from and open the opening.

14. The method of claim 13, wherein the tappet is entrained by the stop part.

15. The method of claim 13, wherein the sealing element is entrained by the stop part.

16. The method of claim 13, wherein the tappet and the sealing element are entrained by the stop part.

17. The method of claim 13, wherein the tappet is configured for movement by the stop part via a positive connection between the stop part and the tappet.

18. The method of claim 13, wherein the sealing element is configured for movement by the tappet via a positive, integral and/or non-positive connection.

* * * * *